United States Patent
Furusu et al.

[11] Patent Number: 5,099,962
[45] Date of Patent: Mar. 31, 1992

[54] BACKING PLATE FOR DISC BRAKE WITH DIFFERENT DAMPING LAYERS FOR BRAKE SQUEAL

[75] Inventors: Katsuya Furusu; Yuji Nagasawa; Shin-ichi Ishiyama; Yoshiyuki Mizutani, all of Aichi, Japan; Yasuaki Ichiba, Shizuoka, Japan; Lynn B. Long, Cincinnati, Ohio

[73] Assignee: Kabushiki Kaisha Toyota Chuo Kenkyusho, Aichi, Japan

[21] Appl. No.: 583,324

[22] Filed: Sep. 17, 1990

[51] Int. Cl.⁵ .................. F16D 65/38; F16D 69/00
[52] U.S. Cl. ........................ 188/73.37; 188/251 A
[58] Field of Search ............... 188/73.1, 73.31, 73.35, 188/73.36, 73.37, 250 B, 250 C, 250 E, 250 R, 251 A, 251 R, 268; 267/136, 141.1, 294, 153, 30; 428/461, 463

[56] References Cited

U.S. PATENT DOCUMENTS

| | | | |
|---|---|---|---|
| 3,066,060 | 11/1962 | Gross | 428/463 X |
| 3,327,812 | 6/1967 | Lazan | 188/268 |
| 3,344,094 | 9/1967 | Gaugue | 188/251 R |
| 3,357,519 | 12/1967 | Anderson et al. | 188/268 X |
| 3,730,920 | 5/1973 | D'Alessandro | 188/251 R X |
| 4,373,615 | 2/1983 | Melinat | 188/73.1 |

FOREIGN PATENT DOCUMENTS

| | | | |
|---|---|---|---|
| 2713377 | 9/1877 | Fed. Rep. of Germany | 188/73.1 |
| 0055732 | 5/1981 | Japan | 188/73.1 |
| 0220234 | 11/1985 | Japan | 267/153 |
| 61-200936 | 12/1986 | Japan | |

Primary Examiner—Robert J. Oberleitner
Assistant Examiner—Josie A. Ballato
Attorney, Agent, or Firm—Oblon, Spivak, McClelland, Maier & Neustadt

[57] ABSTRACT

A damping pad for preventing brake squeal includes: a first metal plate with a brake shoe fixed to one surface thereof; a second metal plate; a third metal plate; a first damping layer disposed between the other surface of the first metal plate and one surface of the second metal plate, and composed of viscoelastic material for high temperature use having a maximum loss factor at a temperature of 50° C. to 100° C.; and a second damping layer disposed between the other surface of the second metal plate and one surface of the third metal plate, and composed of viscoelastic material for low temperature use having a maximum loss factor at a temperature of 0° C. to 30° C. Since the first and second damping layers are formed of different damping materials having different temperature ranges for good damping efficiencies, the use of different kinds of damping materials are employed, so that vibrations which may cause the brake squeal are damped through a wide temperature range, thus preventing the brake squeal.

8 Claims, 5 Drawing Sheets

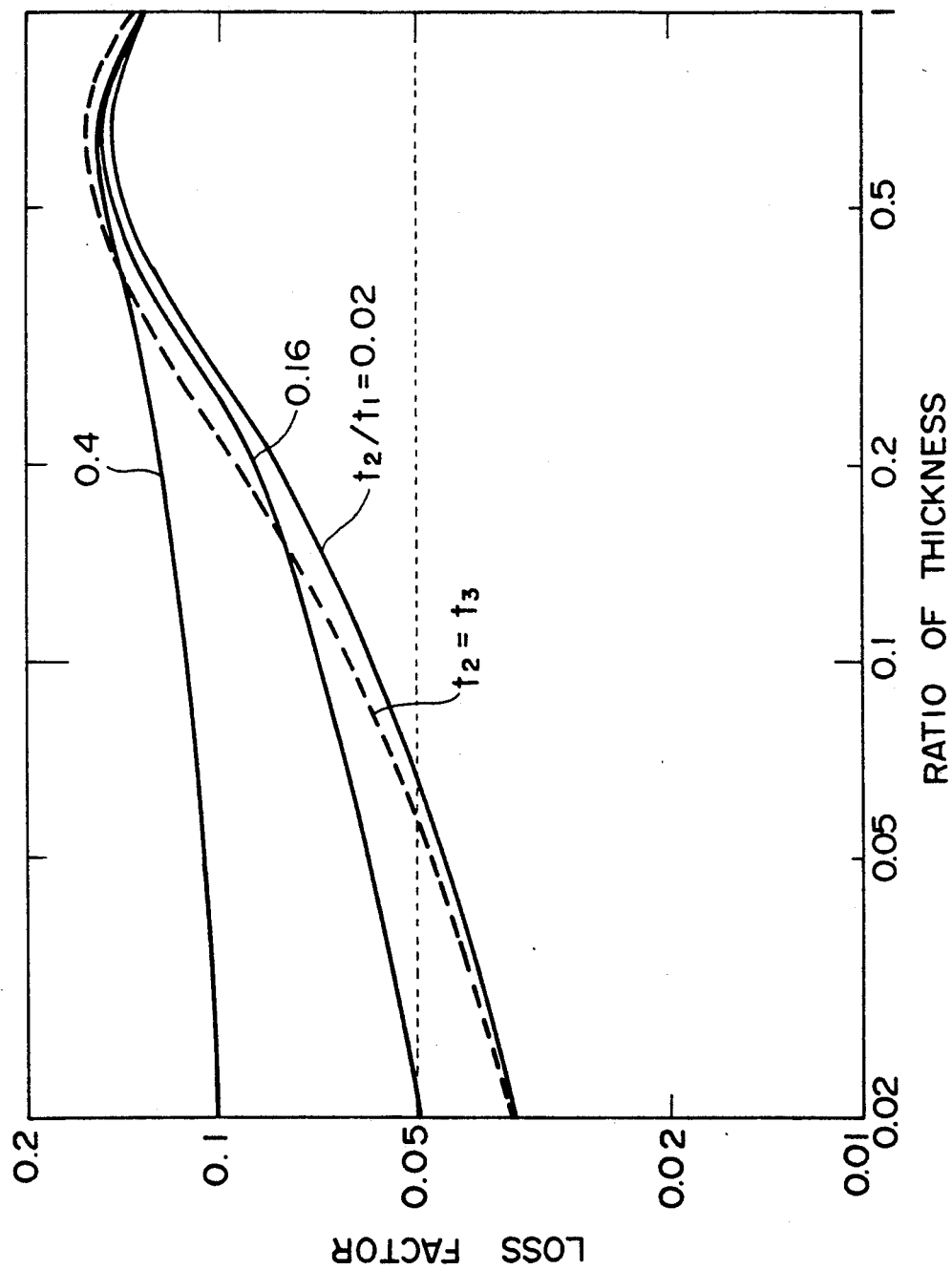

BACKING PLATE FOR DISC BRAKE WITH DIFFERENT DAMPING LAYERS FOR BRAKE SQUEAL

BACKGROUND OF THE INVENTION

1. Field of the Invention

The present invention relates to a damping pad for preventing brake squeal, which particularly serves to improve an effect of preventing the brake squeal.

2. Description of the Related Art

In conventional brakes, particularly in disc brakes, sliding between brake shoes and disc rotors may cause vibration of the rotors and brake shoes in braking operations, which causes vibration of metal plates fixed to the brake shoes and vibration of other components of the disc brakes such as a calipers, resulting in uncomfortable noises or squeal. In order to prevent or suppress such squeal, attempts have been made, as shown in Japanese Unexamined Utility Model Publication No. Sho 61-200936, in which a viscoelastic material is fixed to a metal plate of a brake pad to damp the vibration. With this pad, the damping can however be effectively performed only in a restricted range, and sufficient damping efficiency cannot be obtained.

The inventors of the present invention have specifically studied a cause of brake squeal and have investigated an effective way to suppress or prevent the squeal. As a result, it has been found that the brake squeal cannot be prevented in the prior brake pads due to the fact that an operating temperature range of the brake has not been taken into consideration at all. That is, the temperature range of the brake varies depending on operating conditions. Immediately after the start of a vehicle in a cold condition, the above mentioned viscoelastic material may be kept at a temperature of 0° C. or less nearly the same as an ambient temperature. In hard braking during a high speed driving, the temperature of the above viscoelastic material may increase over 100° C.

However, in the prior brake pads, a loss factor of the viscoelastic material is kept at a high value enough to effectively damp the vibration only in a restricted temperature range as shown in FIG. 4, so that the sufficient damping efficiency cannot be kept through a wide temperature range in which the brake may operate, and a temperature region in which the vibration is insufficiently damped is inevitable, resulting in such a problem that the generation of the brake squeal cannot be prevented. The term loss factor is known in the field of viscoelastics wherein the loss factor of a material is considered as a function of temperature and frequency. In the field of viscoelastics, by using the loss factor of a material $\eta$, complex elasticity is defined as follows:

$$E = (1 + j\eta)$$

wherein $j^2 = -1$ (j is a imaginary number unit) and E is an elasticity constant (Young's modulus or shearing elasticity factor). $\eta$ is physically a dimensionless amount showing the degree of damping efficiency.

Loss factor in a vibration system can be calculated from a frequency response function (FRF) obtained from known vibration tests, which are known in the field of viscoelastics.

SUMMARY OF THE INVENTION

An object of the present invention is to provide a brake pad, overcoming the problems of the prior brake pads as described above, in which the brake squeal can effectively be prevented through a wide range of operating conditions in which the brake squeal may be caused.

According to the present invention, a damping pad for preventing brake squeal comprises a first metal plate with a brake shoe fixed to one surface thereof; a second metal plate; a third metal plate; a first damping layer disposed between the other surface of the first metal plate and one surface of the second metal plate, and composed of viscoelastic material for high temperature use having a maximum loss factor at a temperature of 50° C. to 100° C.; and a second damping layer disposed between the other surface of the second metal plate and one surface of the third metal plate, and composed of viscoelastic material for low temperature use having a maximum loss factor at a temperature of 0° C. to 30° C.

In the damping pad for preventing the brake squeal of the present invention having such structures, the first damping layer disposed between the first and second metal plates is formed of the viscoelastic material for high temperature use having a maximum loss factor at a high temperature of 50° C. to 100° C. Therefore, when the brake shoe vibrates in a temperature elevated by the heat due to the sliding thereof on the disc rotor, and the heat and vibration are transferred to the first metal plate, the temperature of the viscoelastic material can be kept in the high temperature range in which the high damping efficiency can be obtained. Further, since this viscoelastic material has the low heat-conductivity, the second metal plate is kept in a low temperature range even if the brake shoe is heated to the high temperature due to the sliding on the disc rotor, and the second damping layer disposed between the second and third metal plate is also kept in a low temperature range. Therefore, the second damping layer, which is formed of the viscoelastic material for low temperature use having a maximum loss factor at a low temperature of 0° C. to 30° C., can be kept in the temperature range in which this viscoelastic material can have the high damping performance, so that the second damping layer sufficiently exhibits the damping efficiency or performance and thus the brake squeal can be effectively prevented.

In this way, by appropriately selecting and disposing the different kinds of damping materials, which have the high damping efficiencies in the different temperature ranges, respectively, it is possible to effectively prevent the generation of the brake squeal through the wide temperature range.

BRIEF DESCRIPTION OF THE DRAWINGS

FIG. 7 is a diagram illustrating a relationship between a loss factor and a ratio of thickness in the embodiment of the present invention.

DESCRIPTION OF THE PREFERRED EMBODIMENT

Figure 1:
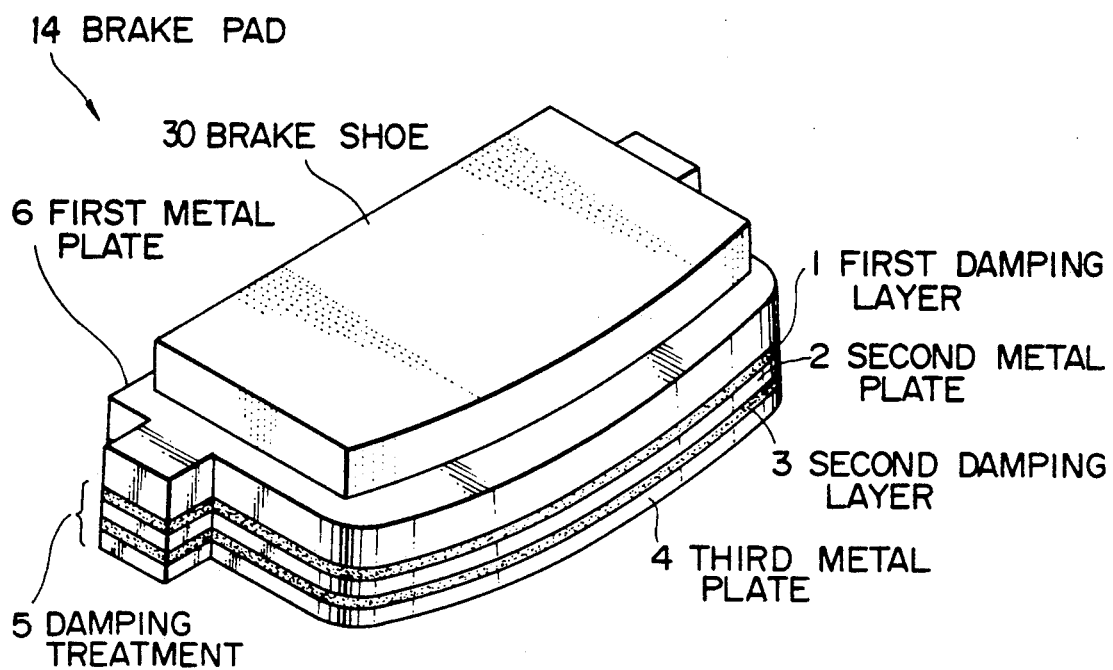
FIG. 1 is a perspective view of an embodiment of the present invention.

The embodiment of the present invention will be described with reference to FIG. 1.

The brake pad according to the embodiment of the present invention comprises: a first metal plate 6 with a brake shoe 7 fixed thereto; second and third metal plates 2, 4 with substantially the same surface shape as that of the first metal plate; a first damping layer 1 disposed between the first and second metal plates; and a second damping layer 3 disposed between the second and third metal plates, the first and second damping layers being formed of different kinds of viscoelastic material having different thermal efficiency.

In this embodiment, the first metal plate 6 has a thickness of about 5 mm, and each of the second metal plate 2 and the third metal plate 4 has a thickness of about 0.8 mm. Each of the first damping layer 1 and the second damping layer 3 has a thickness of about 0.13 mm.

If the thickness of the second and third metal plates is smaller than 0.6 times that of the first metal plate 6, as shown in FIG. 7, the loss factor will increase as the thickness increases. However, in practical use in the brake, the thickness of the plates should be minimized so as to construct a compact brake device.

Contrarily, the thinner viscoelastic material forming the damping layer will have the higher loss factor. However, practical thickness thereof will be approximately 0.13 mm in view of the strength of the damping material and the practical producibility.

The inventors have conducted a vehicle test relating to the ratio of occurrence of squealing. As a result of this test, there is illustrated in FIG. 3 a relationship between the ratio of occurrence of squealing and the required minimum loss factor of the whole brake pad utilizing a damping mechanism by shearing deformation in the damping material during the bending mode.

The test was conducted on the brake pads having different loss factors, respectively, under the temperatures of 20° C. to 75 ° C. at the first damping layer 1 side in the first metal plate.

Figure 3:
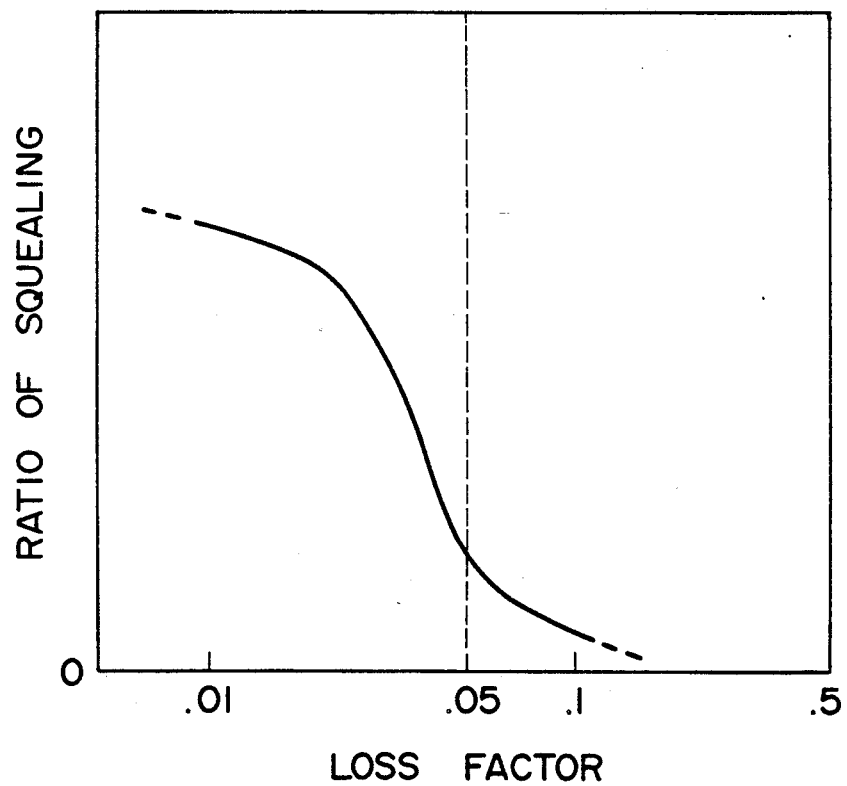
FIG. 3 is a diagram illustrating a relationship between a ratio of squealing and a loss factor.
Figure 4:
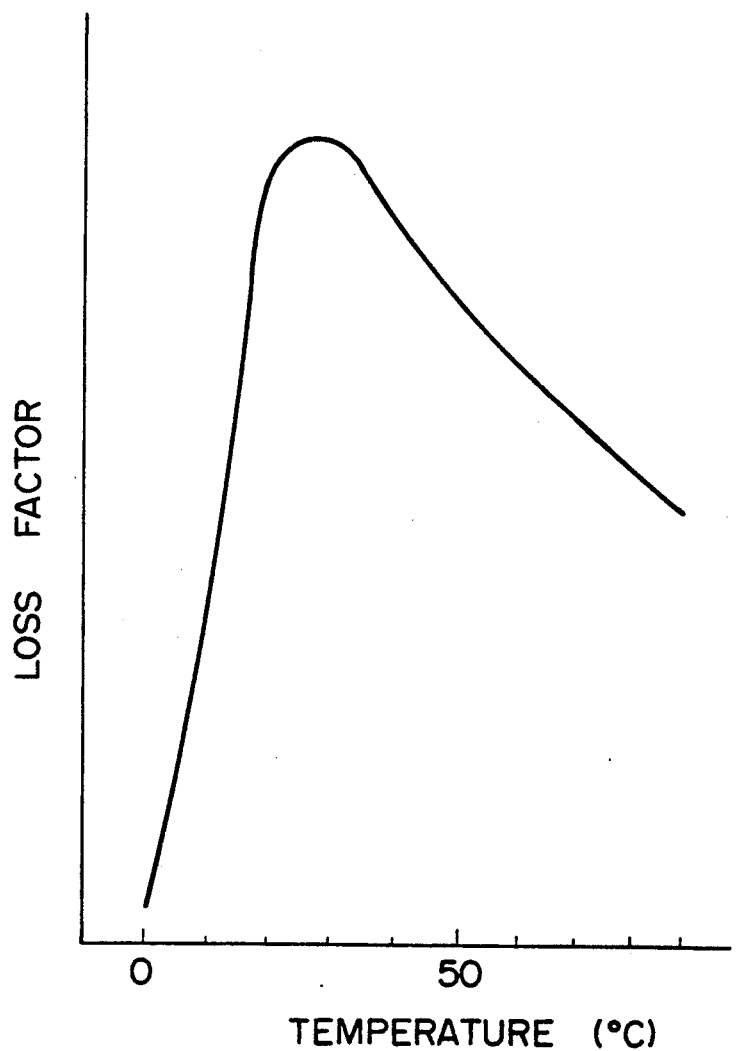
FIG. 4 is a diagram illustrating a relationship between a loss factor and a temperature in conventional viscoelastic material itself.

As a result, it can be seen from FIG. 3 that in connection with the minimum loss factor of the whole brake pad 8, the ratio of occurrence of squealing, (i.e. the number of occurrences of squealing to the number of braking operation) rapidly decreases when the loss factor exceeds the value of 0.05.

It can therefore be seen that by setting the loss factor at the value of 0.05 or more, the number of occurrences of squealing can be decreased, and thus the brake squeal can be effectively prevented.

The first damping material 1 for high temperature use is formed of a viscoelastic material mainly composed of phenol resin and acrylonitrile-butadiene resin, each having a high damping efficiency at the temperature ranging from 50° C. to 100° C. and has its loss factor of at least 1.0 at around 70° C. at which the damping efficiency is the maximum. The second damping material 3 for low temperature use is formed of a viscoelastic material mainly composed of acryl resin having a high damping efficiency at the temperature ranging from 0° C. to 30° C. and having its loss factor of at least 1.0 at around 25° C. at which the damping efficiency is the maximum These viscoelastic materials keep a high loss factor through a relatively wide temperature range, so the embodiment has a minimum loss factor at 50° C., i.e. approximately the middle point of 70° C. and 25° C.

Figure 2:
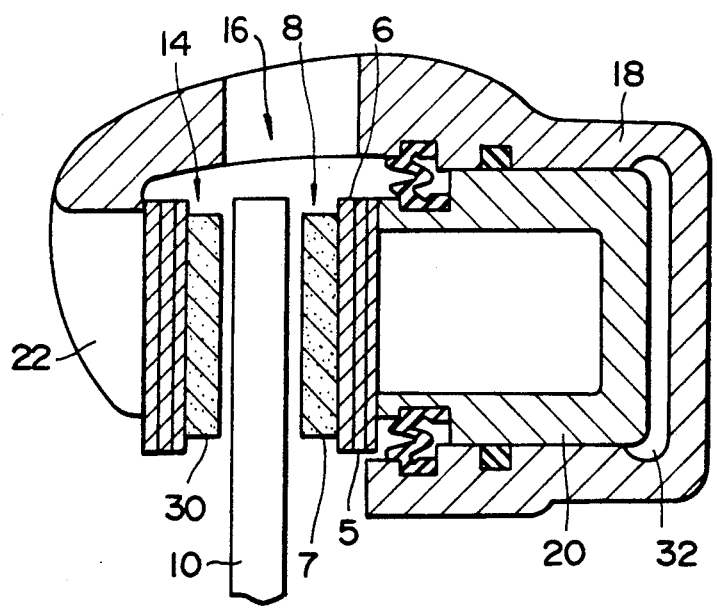
FIG. 2 is a sectional view of a disc brake equipped with the embodiment of the present invention.

FIG. 2 illustrates a brake device equipped with the brake pads of the present invention.

Around a rotary shaft (not shown) is arranged a disc rotor 10 of which opposite surfaces are opposed to an inner pad 8 and an outer pad 14 consisting of the brake pads according to the present invention, respectively. A caliper body 16 is shiftable in a direction parallel to the rotary shaft of the disc rotor 10, and is mounted on a vehicle frame by means of mounting members (not shown). The outer pad 14 is fixed by a pad support (not shown) to the caliper body and thus is shiftable in a direction parallel to the rotary shaft of the disc rotor 10. The inner pad 8 is attached to a piston 20 by a pad support (not shown). The piston 20 is fitted into a cylinder 18 arranged in the caliper body, and is adapted to be moved in the direction parallel to the rotary shaft of the disc rotor 10 by a hydraulic pressure supplied into the hydraulic chamber 32. When a brake pedal (not shown) is stepped on and the hydraulic pressure is supplied into the hydraulic chamber 32 in the cylinder 18, the piston 20 advances to press the inner pad 8 against the disc rotor 10, while due to the reaction force thereof, claws 22 press the outer pad 14 against the disc rotor 10, so that the rotation of the disc rotor 10 is suppressed.

The inner pad 8 and the outer pad 14 consist of the brake pads of the embodiment, respectively.

When the brake pedal is stepped on, and the inner pad 8 and the outer pad 14 are pressed against the disc rotor 10, stick-slip phenomenon occurs between the disc rotor 10 and the brake shoes 7 and 30 due to the sliding thereof. This stick-slip is such a phenomenon that, in the solid friction, sticking and slipping alternately and repeatedly take place on the friction surfaces of two solid bodies, i.e., the rotor and the brake shoe. This phenomenon causes the vibration, and the vibration frequency may coincide with the natural frequency of the rotor or the natural frequency of the caliper, in which case the amplitude of the vibration rapidly increases and spreads, causing the brake squeal.

When the brake squeal is generating, the disc rotor 10 has several vibration nodes along the diameter thereof depending on the frequency of the squeal, i.e., vibration frequency, and it vibrates in the bending mode which displaces in a direction parallel to the rotary shaft of the disc rotor 10. The inner pad 8 and the outer pad 14 also vibrate in the bending mode depending on the frequency.

A damping mechanism in this mode will now be described with reference to FIG. 5.

Figure 5:
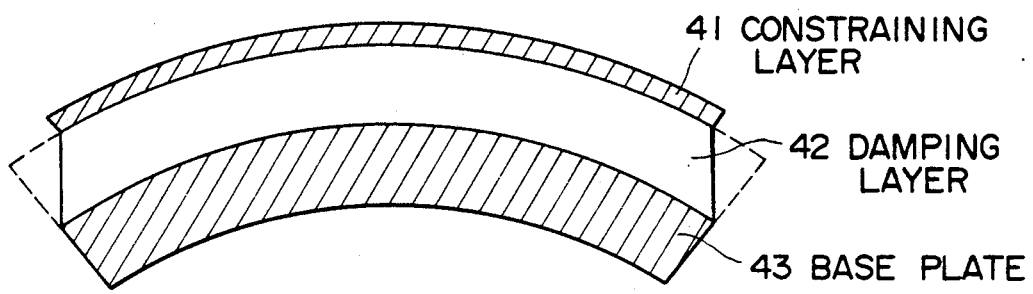
FIG. 5 is a sectional view illustrating a vibration damping mechanism according to the present invention.

During the vibration in the bending mode of the brake pad, a base plate 43 corresponding to the second metal plate 2 of FIG. 1 and a constraining layer 41 corresponding to the third metal plate 4 of FIG. 1 exhibit the bending deformation a shown in FIG. 5. Both surfaces of a damping layer 42 adhere to and are constrained by the constraining layer 41 and the base plate 43, respectively, and a shearing as represented by a difference between the solid line and the broken line is generated in the damping layer 42 in accordance with this bending deformation, resulting in shearing deformation. When the shearing deformation is effective, the damping layer 42 formed of the viscoelastic material exhibits the damping efficiency to reduce the shearing deformation and to prevent the increase of the vibration amplitude of the rotor and the brake shoe, so that the brake squeal is suppressed.

Figure 6:
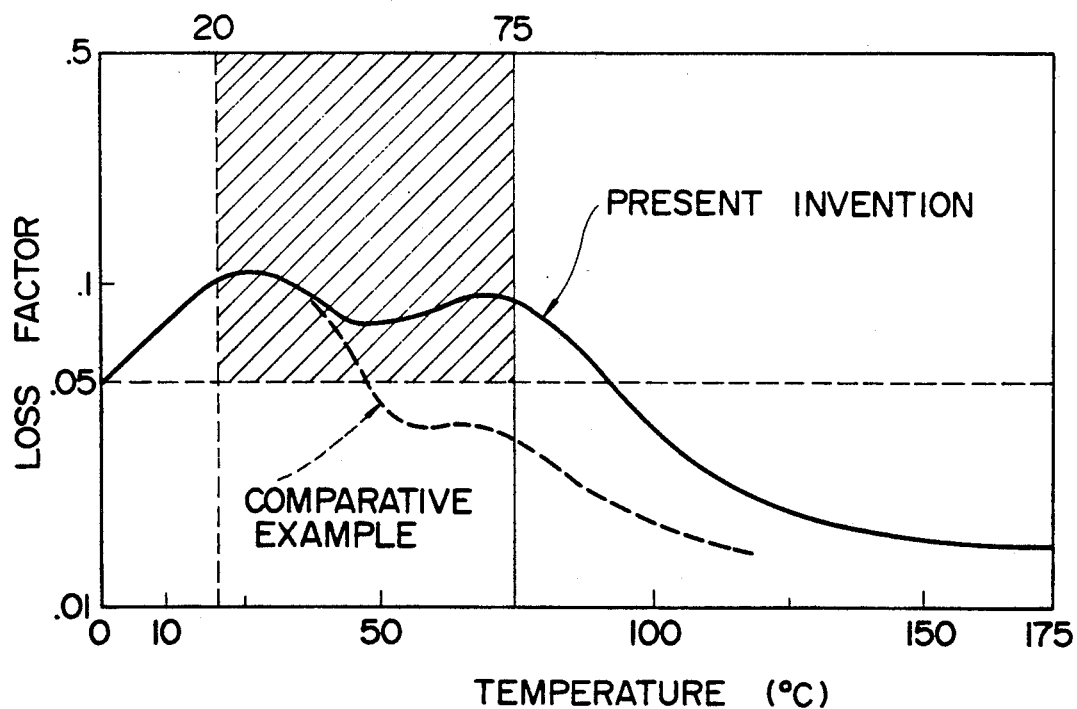
FIG. 6 is a diagram illustrating a relationship between a loss factor and a temperature in the embodiment of the present invention.

FIG. 6 illustrates a variation of the loss factor of the whole pads 8 and 14 of this embodiment at various temperatures. In this case, the frequency of the vibration is approximately 8.5 kHz, and the variation is in a three node bending mode. The maximum loss factor exists at around 70° C. by virtue of the first damping layer 1. The maximum loss factor also exists at around 25° C. by virtue of the second damping layer 3. The maximum loss factor at around 25° C. is a little larger than the maximum loss factor at around 70° C.

The loss factor of the viscoelastic material itself has a maximum value exceeding 1.0. However, in this embodiment utilizing it, the loss factor of the whole brake pad including the damping layers has the maximum value of about 0.1.

In this embodiment, the loss factor has a maximum value at 25° C. in the lower temperature side and at 70° C. in the higher temperature side. The difference between the two temperatures is about 45° C., so that a minimum loss factor value between the two maximum loss factor values is at least 0.05 due to this relatively small difference. Since the loss factor exceeds the value of 0.05 throughout the temperature range from 0° C. to 90° C., respectively, the brake squeal can be prevented in the wide temperature range from 0° C. to 90° C.

FIG. 7 illustrates the loss factor of the whole brake pad at the temperature of 50° C., which is a typical value in the temperature range from 0° C. to 90° C., in which the abscissa represents the ratio of the thickness of the third metal plate 4 to the thickness of the first metal plate 6, and a parameter $t_2/t_1$ represents the ratio of the thickness of the second metal plate 2 to the thickness of the first metal plate 6. The broken line represent the loss factor in the case that the second metal plate 2 is the same ($t_2=t_3$) in thickness as the third metal plate 4.

As previously described, in order to prevent the brake squeal, it is necessary to keep the loss factor of the whole brake pad at 0.05 or more, and to ensure the strength against the deformation of the third metal plate 4 on the surface where the third metal plate 4 and the piston 20 are contacted. It is also necessary to minimize the thickness of the brake pad. In order to satisfy these requirements, the ratio of the thickness of the second and third metal plates to the thickness of the first metal plate should be in a range from 0.11 to 0.19. In this embodiment, the ratio of the thickness of each of second and third metal plates to the thickness of the first metal plate is 0.16, respectively.

For comparison of the effects for preventing the brake squeal by the embodiment and the prior art, an example including only one of the two damping layers in the embodiment was compared with the embodiment.

The comparison was made with respect to the variation of the loss factor of the whole brake pad relative to the temperature of the viscoelastic material as well as the ratio of occurrence of squealing.

In the comparative example, the first damping material 1 and the second metal plate 2 in the embodiment were eliminated and the second damping material, i.e., the viscoelastic material 3, for low temperature use, was left in the structure. In this case, the loss factor exceeded the value of 0.1 at around 25° C., and decreased to the value of less than 0.05 at the temperature of about 50° C. and more. From the result of the occurrence of brake squeal, it was recognized that the brake squeal was liable to generate at the higher temperature side.

In a similar manner, the test was made with the structure in which the second damping material 3 and the third metal plate 4 were eliminated, and the first damping material, i.e., the viscoelastic material for high temperature use, was left. It was found that the loss factor was less than 0.05 at the temperature of about 50° C. and less, and the ratio of occurrence of squealing became high at this temperature range.

It can be noted from the above that both kinds of the damping materials in the lower and higher temperature sides are required for preventing the brake squeal through the wide temperature range.

Furthermore, in order to clarify the effect of the specific arrangement of the two viscoelastic material in the embodiment, a comparative example was prepared in which the position of viscoelastic material for high temperature use was exchanged for that of viscoelastic material for low temperature use In this comparative example, the first damping layer 1 disposed near the brake shoe is formed of the viscoelastic material with a high damping efficiency in the low temperature range, and the second damping layer 3 is formed of the viscoelastic material with a high damping efficiency in the high temperature range.

In FIG. 6, a broken line represents a relationship between the loss factor and the temperature in the comparative example. As illustrated in FIG. 6, the loss factor of the comparative example has the same value as that of the embodiment at around 25° C. However, the loss factor of the comparative example is less than 0.05 at around 70° C., i.e. the value considerably lower than that of the embodiment. Therefore, it is found that the brake squeal can not be prevented in the high temperature range in the comparative example. This is because the first damping layer disposed near the brake shoe is formed of the viscoelastic material with high damping efficiency at low temperature which becomes soft and remarkably lower in damping efficiency at high temperature, resulting in that the first metal plate keeps vibrating without being damped.

As described above, in the brake pad according to the present invention, the viscoelastic material should have good efficiency throughout the temperature range which sufficiently covers the various temperature conditions for the braking operation. In addition thereto, it is necessary to employ the material having sufficient structural and mechanical durability as well as thermal durability with respect to the operating condition such as pressure applied by the piston 20 to the pad for operating the brake and the variation of the temperature caused by the heat due to the braking operation. The damping material for low temperature use, which is arranged at a position more distant than the damping material for high temperature use from the heat source, i.e., friction surface, may also be temporarily subjected to the high temperature in some operating conditions, so that it should not be formed of the material, of which nature and efficiency may be substantially deteriorated by the high temperature.

Since the damping material for high temperature use is naturally subjected to the higher temperature, it requires more durability. The damping material for high temperature use used in the embodiment of the present invention, the material is formed of the viscoelastic material mainly composed of the phenol resin and acrylonitrile-butadiene resin, as already described, so that the first damping material, of which temperature may be substantially elevated by the friction heat generated in the braking operation, can have the high heat resistance, and also suppress the heat transfer to the second damping material so as to protect the second damping material from the heat and to prevent the deterioration of the damping efficiency.

Further, the damping material for low temperature use is mainly composed of acryl resin, so that it has the relative good heat resistance as the material for the low temperature, resulting in less deterioration in the nature and efficiency, and has the sufficient damping efficiency.

In this embodiment, minute bubbles are contained or mixed in the damping material for high temperature use which constitutes the first damping layer.

These minute bubbles mixed in the damping material for high temperature use can also effectively prevent the heat transfer to the second damping material, whereby the second damping material is protected from the heat, the deterioration in the damping efficiency is prevented and the brake squeal can effectively be prevented through the wide temperature range from the low value to the high value.

Further, in the embodiment of the present invention, a third damping material having a maximum present loss factor at about 50° C. may be disposed between the first and second damping layers, and metal plates may be disposed between the adjacent two damping layers, respectively.

As previously stated, the viscoelastic material used in the embodiment of the present invention has maximum loss factors at around 25° C. and 70° C. Instead of this viscoelastic material, if such viscoelastic material is used that has a maximum value outside the range of from 20° C. to 75° C., a minimum value existing between them would become smaller and so it would be necessary to increase the damping factor at the minimum value. In this case, a third damping material having a maximum loss factor at about 50° C. may be used to keep a large loss factor through a wider temperature range so as to effectively prevent the brake squeal.

Further, in such a case that the material has two maximum values relatively adjacent to each other near the middle point of the temperature range, the loss factors of the material at the ends of the temperature range would become smaller, so that it would be necessary to employ such materials as to increase the damping factors at those points.

If it is also necessary to prevent the brake squeal in the high temperature range over 100° C., additional damping material having a high loss factor in the high temperature range may be employed.

What is claimed is:

1. A damping pad for preventing brake squeal comprising:
    a first metal plate with a brake shoe fixed to one surface thereof;
    a second metal plate;
    a third metal plate;
    a first damping layer disposed between the other surface of said first metal plate and one surface of said second metal plate, and composed of viscoelastic material for high temperature use having a maximum loss factor at a temperature of 50° C. to 100° C.; and
    a second damping layer disposed between the other surface of said second metal plate and one surface of said third metal plate, and composed of viscoelastic material for low temperature use having a maximum loss factor at a temperature of 0° C. to 30° C.

2. A damping pad according to claim 1, wherein said damping pad has a loss factor of at least 0.05 at a temperature of 20° C. to 75° C.

3. A damping pad according to claim 1, wherein said damping pad has maximum loss factors at a temperature of 50° C. to 100° C. and at a temperature of 0° C. to 30° C., respectively, the difference between said two temperatures being about 45° C.

4. A damping pad according to claim 1, wherein said damping pad has maximum loss factors at around 25° C. and 70° C., and a minimum loss factor at around 50° C.

5. A damping pad according to claim 1, wherein a maximum loss factor of said damping pad at a temperature of 0° C. to 30° C. is larger than a maximum loss factor thereof at a temperature of 50° C. to 100° C.

6. A damping pad according to claim 1, wherein the ratio of the thickness of said second metal plate to the thickness of said first metal plate is between 0.11 and 0.19, and the ratio of the thickness of said third metal plate to the thickness of said first metal plate is between 0.11 and 0.19.

7. A damping pad according to claim 6, wherein the ratio of the thickness of said second metal plate to the thickness of said first metal plate is 0.16, and the ratio of the thickness of said third metal plate to the thickness of said first metal plate is 0.16.

8. A damping pad according to claim 1, wherein
    said first damping layer is formed of viscoelastic material comprising phenol resin and acrylonitrile-butadiene resin, each of said phenol resin and acrylonitrile-butadiene resin having a maximum loss factor of at least 1.0; and
    said second damping layer is formed of viscoelastic material comprising of acryl resin, said acryl resin having a maximum loss factor of at least 1.0.

* * * * *